United States Patent
Kozin

(10) Patent No.: US 9,863,834 B2
(45) Date of Patent: Jan. 9, 2018

(54) INDICATOR FOR PROVING TIGHTNESS OF SEALS IN A PACKAGING CONSISTING OF AT LEAST PARTIALLY LIGHT PERMEABLE THERMOPLASTIC FILM

(71) Applicant: Peter Kozin, Ljubljana (SI)

(72) Inventor: Peter Kozin, Ljubljana (SI)

( * ) Notice: Subject to any disclaimer, the term of this patent is extended or adjusted under 35 U.S.C. 154(b) by 146 days.

(21) Appl. No.: 15/034,652

(22) PCT Filed: Nov. 3, 2014

(86) PCT No.: PCT/SI2014/000062
§ 371 (c)(1),
(2) Date: May 5, 2016

(87) PCT Pub. No.: WO2015/069195
PCT Pub. Date: May 14, 2015

(65) Prior Publication Data
US 2016/0252421 A1    Sep. 1, 2016

(30) Foreign Application Priority Data

Nov. 5, 2013 (SI) .................................. 201300364
Oct. 28, 2014 (SI) .................................. 201400398

(51) Int. Cl.
*G01M 3/00* (2006.01)
*G01M 3/04* (2006.01)
(Continued)

(52) U.S. Cl.
CPC .............. *G01M 3/20* (2013.01); *G01M 3/226* (2013.01); *G01M 3/227* (2013.01); *G01M 3/3218* (2013.01)

(58) Field of Classification Search
CPC ............ G01M 3/00; G01M 3/04; G01M 3/20; G01M 3/22; G01M 3/226; G01M 3/227; G01M 3/32; G01M 3/3218
See application file for complete search history.

(56) References Cited

U.S. PATENT DOCUMENTS 3,805,595 A * 4/1974 Dobry ................. G01M 3/3218
 73/49.3
5,361,626 A * 11/1994 Colligan ................. G01M 3/20
 73/40.7

(Continued)

FOREIGN PATENT DOCUMENTS

WO     WO 00/67014 A1     11/2000
WO     WO 2009095572 A1 *  8/2009 .......... G01M 3/3218

OTHER PUBLICATIONS

International Search Report and Written Report issued in PCT/SI2014/000062 dated Feb. 27, 2015 (7 pages).

*Primary Examiner* — Nguyen Ha
(74) *Attorney, Agent, or Firm* — Haynes and Boone, LLP; William B. Nash; Joseph Mencher

(57) ABSTRACT

A seal testing system provides an indicator of the tightness of seals in packaging of the seal testing system includes at least partially light permeable thermoplastic film providing two flexible layers that are impermeable for liquid and that are circumferentially sealed to define chambers that store a seal testing fluid and that are interconnected via a narrowed intermediate passage. At least section of a seal between the film layers is weakened to allow release of the seal testing fluid when pressure is introduced in the chambers.

20 Claims, 2 Drawing Sheets

(51) Int. Cl.
    *G01M 3/20*     (2006.01)
    *G01M 3/22*     (2006.01)
    *G01M 3/32*     (2006.01)

(56) References Cited

U.S. PATENT DOCUMENTS

| | | | | |
|---|---|---|---|---|
| 5,493,899 | A * | 2/1996 | Beck | G01M 3/04 |
| | | | | 436/3 |
| 5,499,529 | A * | 3/1996 | Kronberg | G01M 3/227 |
| | | | | 73/40.7 |
| 8,910,509 | B2 * | 12/2014 | Terentiev | G01M 3/229 |
| | | | | 73/40 |
| 9,612,216 | B2 * | 4/2017 | Taylor | G01M 3/002 |
| 2006/0277975 | A1 | 12/2006 | Barcan | |
| 2007/0212789 | A1 | 9/2007 | Havens et al. | |
| 2013/0111972 | A1 * | 5/2013 | Subhash | G01M 3/366 |
| | | | | 73/12.01 |
| 2016/0209294 | A1 * | 7/2016 | Wetzig | G01M 3/3281 |

* cited by examiner

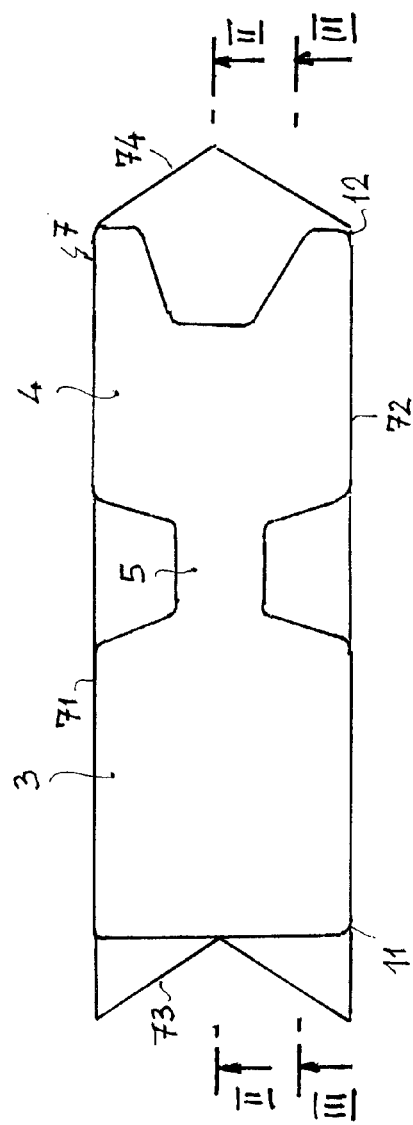
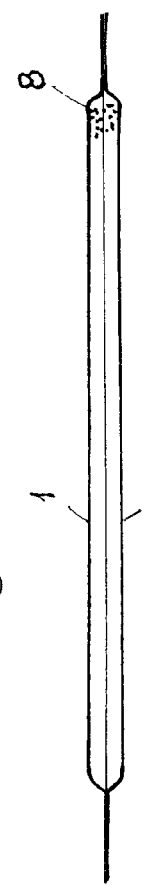
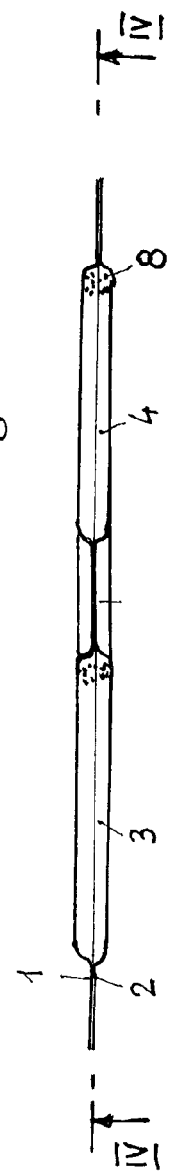
Fig. 1
Fig. 2
Fig. 3

INDICATOR FOR PROVING TIGHTNESS OF SEALS IN A PACKAGING CONSISTING OF AT LEAST PARTIALLY LIGHT PERMEABLE THERMOPLASTIC FILM

CROSS-REFERENCE TO RELATED APPLICATION

This application is a United States national phase application of co-pending international patent application number PCT/SI2014/000062, filed Nov. 3, 2014, which claims the benefit of Slovenia Application No. P-201300364 filed Nov. 5, 2013, and Slovenia Application No. P-201400398 filed Oct. 28, 2014, the contents of which are hereby incorporated by reference in its entirety.

BACKGROUND

Pursuant to IPC, the invention refers to processing of plastics, namely to formation or interconnecting and subsequent treatment of formed products, and quite exactly to connecting each product by means of a thermally shrinkable film. Moreover, the invention may also refer to multi-layered packaging containing artificial resins, in particular polyester. Still further, the invention may also refer to physics, namely to testing and in particular to constructional concept of indicators.

In this, the purpose of the invention is to create an indicator for proving of tightness of a packaging consisting of at least partially light permeable thermoplastic film, wherein such indicator should enable occasional i.e. periodical testing by means of a penetration dye, by which each user and each environment should be prevented from any risks of pollution by said penetration dye.

A method of detecting tightness of weakness of welded packaging is generally disclosed in WO 2005/159500 A1 or in CN 101726395 B.

The invention generally refers to a packaging, namely to testing of said packaging, and in particular to proving tightness of seals in a sterilization or any other packaging, which is produced either in industrial processes, or in the sterilization area by means of specific welding appliances.

Quite exactly, the invention refers to proving quality of seals in a soft sterilization packaging, which is usually made of a layer, which is permeable for each sterilization media and represents sterilization paper or any other filtering layer, as well as of a non-permeable translucent synthetic layer, usually a PET/PP or PET/PE laminated film. When such packaging is closed, both layers are welded along the edges by means of special welding apparatus and by means of temperature and pressure, by which a closed sterilization packaging is produced, which is permeable for sterilization media and provides a barrier for microorganisms.

Such welding appliances are capable to realize at least 6 mm wide seal between said laminated film and said barrier layer, wherein due to various reasons from time to time such seal is not continuous and tight. This means that such seal contains non-welded areas in the form of channels, which extend between said non-welded layers towards the exterior and enable microorganisms to intrude towards each sterilized content.

The invention is dealing with proving of tightness and quality of seals in such packaging. The object of the invention is to create a test, namely an indicator for proving tightness of sterilization, which should comply with the standard ISO EN 11607 and ASTM F 1929, to which ISO EN 11607 refers, and which would also be user friendly and would enable daily routine control.

Pursuant to said standard ASTM F 1929, tightness of seals is tested by means of colored dye like the fluid TRITON X-100, which is characterized by extremely efficient intruding into pores, so that each irregularity in the seal becomes visible as soon as the dye has penetrated into it.

The method of such testing is however not quite user friendly, since the liquid must be introduced drop by drop into each packaging, which means that the packaging must be open i.e. not welded on at least one end portion thereof, which may lead to pollution of the surrounding with said testing liquid. Due to its penetration efficiency, removing of liquid is then extremely difficult, which leads to huge problem in various tests, since in most cases pollution occurs despite to due care.

Commercially available state of the art sets like e.g. HAWO INK TEST (www.hawo.com) include said testing liquid, which is then introduced, preferably drop by drop, into each examined packaging. Such test is characterized by set in kit comprising 75 ml of testing liquid and twenty pipettes, which are suitable for introducing of testing liquid into each examined packaging. There is always a high risk of pollution of the surrounding, since said testing liquid must be drop by drop introduced into open flexible packaging, which is held by one hand, by simultaneously observing penetration of said testing liquid. All known providers offer the same principle of testing.

The invention solves this problem by means of a container, in which the testing liquid is stored and which is then inserted and welded into each packaging, upon which said container is broken within the closed packaging, so that the testing liquid is released within the packaging, which is then followed by visual observing i.e. evaluation of quality of seals in accordance with ASTM F 1929.

Container can be provided in various embodiments like a rigid one or a flexible, or in any other acceptable form, however, it must enable releasing of testing liquid by means of breaking or in any other way within the closed packaging. A rigid container is e.g. a capsule made of a rigid disintegratable material, which is due to a mechanical loading broken, by which the testing penetration liquid is released.

A flexible container is furnished with regular seals, which form two chambers, which are separated by means of a narrowed passage i.e. meander, which makes extraction of testing liquid easier, since upon inserting the indicator into each examined packaging in vertical position the testing liquid is transposed from the first chamber into the second chamber adjacent to a weakened seal, upon which said narrowed passage is pressed and interrupted, by which the required hydrostatic pressure is easily established in order to discontinue said weakened seal and extract the testing liquid.

Testing by using such approach requires inserting such container into each examined packaging, which is followed by closing i.e. welding of packaging and then also with releasing of the testing fluid by means of breaking the container.

The same container and the same procedure of releasing the testing liquid can also be used for introducing said liquid into reusable sterilization packaging, wherein the liquid assures maintaining surgical instrument in wet conditions and prevented from drying each waste thereon prior to cleaning.

When said liquid is introduced into a reusable packaging, then a slightly greater container is required as an independent unit, which can be inserted into said reusable packaging in order to release the liquid, or said container can also be conceived as a part of said reusable sterilization packaging.

Method for introduction of said testing penetration liquid for the purpose of identification of irregularities of seals of a sterilization or any other packaging, or for introduction of penetration liquid into a reusable sterilization packaging, comprises releasing of the liquid from a rigid or flexible or any other container by means of disintegration thereof upon being inserted into each examined packaging, which can be closed.

The container for introduction of said testing penetration liquid for the purposes of identification of irregularities in seals of each sterilization or any other packaging is characterized by releasing of testing liquid on the basis of disintegration of a weakened seal in a flexible container, or of any other seal or any other part of the container, which is achieved by exposing each packaging, together with the indicator inserted therein, to each required pressure.

The previously described container for testing liquid is further characterized by seals, the regular seals of which form two chambers for storage of testing liquid, which are separated by means of a narrowed passage, which makes extraction of testing liquid easier, since upon inserting the indicator into each examined packaging in vertical position the testing liquid is transposed from the first chamber into the second chamber adjacent to a weakened seal, upon which said narrowed passage is pressed and interrupted, by which the required hydrostatic pressure is easily established in order to discontinue said weakened seal and extract the testing liquid.

The invention proposes an indicator for proving tightness of seals in a packaging consisting of at least partially light permeable thermoplastic film, wherein such indicator is conceived as a cushion consisting of two liquid-impermeable flexible film layers, which are welded to each other along the complete circumference and between which a penetration liquid is stored, and wherein said layers are welded to each other in such manner that two chambers are formed between them, which are connected with each other in the area of a narrowed passage and with the possibility of transposition of said penetration fluid between each other, and wherein at least one section of the seal between said film layers is weakened.

In a preferred embodiment of the invention, said first chamber is located on the first end portion of the indicator, the second chamber is located on the second end portion of the indicator, and said weakened section of the seal is arranged on the terminal area of the second chamber, which is located on the second end portion of the indicator and faced away from the first chamber.

The previously mentioned embodiment is furthermore characterized in that said seal between the layers comprises, in addition to said weakened section, at least two longitudinal sections, which are spaced apart from each other, as well as at least one transversal section, while said narrowed passage between both chambers is formed by means of two meanders, which are deflected towards each other and arranged at least approximately in the central region of said longitudinal sections of the seal.

The preferred embodiment of the invention further provides that said weakened section of the seal is trapezoidal and comprises a central transversal section and two lateral sections, which extend to the firstly mentioned section towards the second chamber and converge in a direction towards the first chamber.

The invention moreover preferably provides that the circumference of the indicator is arrow-shaped and adapted due to visualization of a direction of extraction of the penetration liquid from the first chamber into the second chamber towards the weakened section of the seal. Within the said context, the circumference of the indicator can be formed by two longitudinal edges, which extend at least approximately parallel to each other, the first transversal section, which is arranged on the first end portion and is deflected towards the first chamber, and the second transversal section, which is arranged on the second end portion and is deflected in a direction away from the second chamber.

BRIEF DESCRIPTION OF DRAWINGS

The invention will be described in more detail on the basis of an embodiment, which is presented in the attached drawings, wherein FIG. 1 is a top view of the indicator according to the invention;

FIG. 2 is a longitudinal cross-section along the plane II-II;

FIG. 3 is a longitudinal cross-section along the plane III-III;

DETAILED DESCRIPTION

Figure 4:
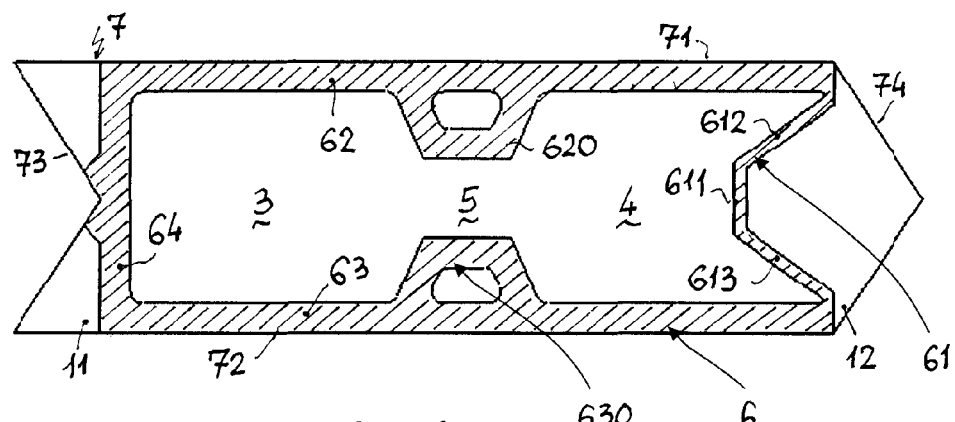
FIG. 4 is a longitudinal cross-section along the plane IV-IV.
Figure 5:
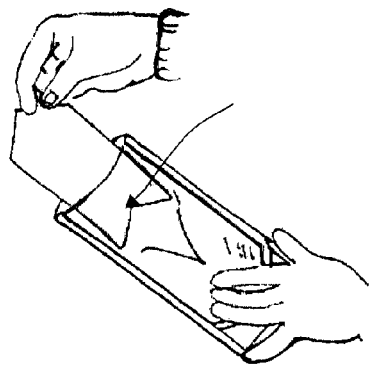
FIG. 5 presents said indicator during the use, namely during the initial stage, in which the indicator is inserted into a packaging, in which the tightness of seals is being proven.
Figure 6:
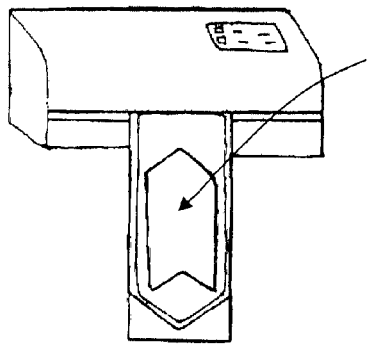
FIG. 6 presents said indicator during the use, namely by welding of a previously open end portion of the packaging, in which the tightness of seals is being proven.
Figure 7:
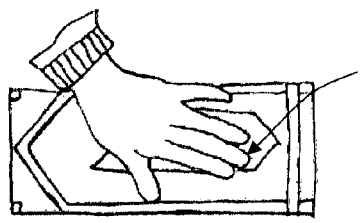
FIG. 7 presents said indicator during the use, namely during the final stage, in which the packaging together with said indicator stored therein is exposed to compression in order to break the indicator and to spread the penetration liquid within the packaging towards the seals.

A top view of an indicator for proving tightness of seals in a packaging consisting of at least partially light permeable thermoplastic film is presented in FIG. 1. The indicator is generally conceived as a cushion consisting of two liquid-impermeable layers 1, 2 of a film, which are sealed to each other essentially along the complete circumference thereof and between which a penetration liquid 8 is stored. Said layers 1, 2 are welded to each other in such manner that two chambers 3, 4 are formed between them, which are with the possibility of flowing each liquid from one to another interconnected via a narrowed passage 5, wherein at least one section 61 of the seal 6 between said layers 1, 2 is weakened. Such concept then allows the inserting said indicator together with each penetration fluid 8 into the interior of each packaging, in which the tightness of seals is being proven (FIG. 5). As soon as the indicator is inserted within each packaging, the latter is completely welded (FIG. 6). Upon that, the penetration liquid 8 is transposed from the first chamber 3 into the second chamber 4, in which the pressure is increased. By exposing the indicator to a pressure in the area of said narrowed passage 5, the penetration liquid 8 is prevented to return from said second chamber 4 back to the first chamber 3. Due to increased pressure within the second chamber 4, the weakened section 61 of the seal 6 is then interrupted, by which the penetration liquid 8 is allowed to flow out from said second chamber 4 into each packaging, in which the tightness of the seal 6 is being proven.

To this aim, the first chamber 3 is located on the first end portion 11 of the indicator, and the second chamber 4 is located on the second end portion 12 of the indicator, while said weakened section 61 of the seal 6 is arranged on the second end portion 12 of the second chamber 4 of the indicator, which is faced away from the first chamber 3.

Regarding the embodiment according to FIGS. 1-4, the seal 6 in addition to said weakened section 61 comprises at least two longitudinal sections 62, 63, which are spaced apart of each other, as well as at least one transversal section 64, wherein said narrowed passage 5 between the chambers 3, 4 is formed by means of two meanders 620, 630, which are deflected towards each other and which are located at least approximately in the central area of said longitudinal sections 62, 63 of the seal 6.

In a preferred embodiment (FIG. 4), the weakened section 61 of the seal 6 is trapezoidal and comprises a central transversally extending portion 611 and lateral portions 612, 613, which extend towards the firstly mentioned portion in the area of the second chamber 4 and converge towards the first chamber 3.

Moreover, in the shown embodiment (FIGS. 1 and 4), the indicator circumference 7 is shaped as an arrow and herewith adjusted for visualization of the direction, in which the penetration liquid 8 is extracted from the first chamber 3 through said passage 5 into the second chamber 4 in a direction towards said weakened section 61 of the seal 6. In such case, the circumference 7 of the indicator is formed by two longitudinal edges 71, 72, which extend at least approximately parallel to each other, while the first transversal edge 73 is arranged on the first end portion 11 of the indicator and is deflected towards the first chamber 3, and the second transversal edge 74 is located on the second end portion 12 of the indicator and is deflected in a direction apart from the second chamber 4.

The invention claimed is:

1. A seal testing system, comprising:
   a pair of liquid-impermeable flexible film layers;
   a circumferential seal that is provided between the pair of film layer and that causes the pair of film layers to define a first chamber to a second chamber by a narrowed passage;
   at least one section of the circumferential seal between the pair of film layers that is located adjacent the second chamber and that is weakened relative to the remainder of the circumferential seal to provide a weakened seal section; and
   a seal testing liquid included in at least one of the first chamber and the second chamber, wherein the weakened seal section provides for release of the seal testing liquid from the at least one of the first chamber and the second chamber in response to a pressure introduced in the second chamber.

2. The seal testing system of claim 1, wherein the first chamber is located adjacent a first end portion of the pair of film layers, the second chamber is located adjacent a second end portion of the pair of film layers that is opposite the first end portion, and the weakened seal section is located between the second chamber and the second end portion and opposite the second chamber from the first chamber.

3. The seal testing system of claim 1, wherein the circumferential seal between the pair of film layers includes two longitudinal sections that are spaced apart from each other, at least one transversal section extending between the two longitudinal sections, and two meanders extending towards each other in a central region of the two longitudinal sections to define the narrowed passage and at least a portion of each of the first chamber and the second chamber.

4. The seal testing system of claim 1, wherein a portion of the weakened seal section includes a trapezoidal shape and comprises a central transversal section and two lateral sections that extend to the central transversal section and towards the second chamber to converge in a direction towards the first chamber.

5. The seal testing system of claim 1, wherein at least one of the pair of film layers includes an arrow-shaped circumference that provides for a visualization of a direction of flow of the seal testing liquid from the first chamber, through the narrowed passage, into the second chamber, and out of the weakened seal section.

6. The seal testing system of claim 5, wherein the arrow-shaped circumference is provided by two longitudinal edges that are approximately parallel to each other, an arrow tail section that is located on a first end portion of the at least one of the first layer and the second layer and that is deflected towards the first chamber, and an arrow head section, which is located on a second end portion of the at least one of the first layer and the second layer and that is deflected away from the second chamber.

7. The seal testing system of claim 1, further comprising:
   sealed packaging that houses the pair of film layers sealed by the circumferential seal that causes the pair of film layers to define the first chamber and the second chamber that are coupled together by the narrowed passage and that include the seal testing liquid.

8. A method for testing a seal, comprising:
   positioning a seal testing system in a package housing defined by a package, wherein the seal testing system includes:
      a pair of liquid-impermeable flexible film layers that are circumferentially sealed together to define a first chamber connected to a second chamber by a narrowed passage;
      at least one section adjacent the second chamber that is weakened relative to the remainder of the circumferentially sealed pair of film layers to provide a weakened seal section; and
      a seal testing liquid included in at least one of the first chamber and the second chamber;
   sealing the package to seal the seal testing system in the package housing;
   introducing a pressure in the second chamber to cause the weakened seal section to release of the seal testing liquid from the at least one of the first chamber and the second chamber and into the package housing.

9. The method of claim 8, wherein the first chamber is located adjacent a first end portion of the pair of film layers, the second chamber is located adjacent a second end portion of the pair of film layers that is opposite the first end portion, and the weakened seal section is located between the second chamber and the second end portion and opposite the second chamber from the first chamber.

10. The method of claim 8, wherein a circumferential seal between the pair of film layers includes two longitudinal sections that are spaced apart from each other, at least one transversal section extending between the two longitudinal sections, and two meanders extending towards each other in a central region of the two longitudinal sections to define the narrowed passage and at least a portion of each of the first chamber and the second chamber.

11. The method of claim 8, wherein a portion of the weakened seal section includes a trapezoidal shape with a central transversal section and two lateral sections that extend to the central transversal section and towards the second chamber to converge in a direction towards the first chamber.

12. The method of claim 8, wherein at least one of the pair of film layers includes an arrow-shaped circumference that provides for a visualization of a direction of flow of the seal testing liquid from the first chamber, through the narrowed passage, into the second chamber, and out of the weakened seal section.

13. The method of claim 12, wherein the arrow-shaped circumference is provided by two longitudinal edges that are approximately parallel to each other, an arrow tail section that is located on a first end portion of the at least one of the first layer and the second layer and that is deflected towards the first chamber, and an arrow head section, which is located on a second end portion of the at least one of the first layer and the second layer and that is deflected away from the second chamber.

14. The method of claim 8, further comprising:
determining a seal quality based on the seal testing liquid escaping the package housing.

15. A method for providing a seal testing system, comprising:
providing a circumferential seal between a pair of film layers that causes the pair of film layers to define a first chamber connected to a second chamber by a narrowed passage;
introducing a seal testing liquid into at least one of the first chamber and the second chamber; and
creating at least one section of the circumferential seal between the pair of film layers that is located adjacent the second chamber and that is weakened relative to the remainder of the circumferential seal to provide a weakened seal section, wherein the weakened seal section provides for release of the seal testing liquid from the at least one of the first chamber and the second chamber in response to a pressure introduced in the second chamber.

16. The method of claim 15, wherein the first chamber is located adjacent a first end portion of the pair of film layers, the second chamber is located adjacent a second end portion of the pair of film layers that is opposite the first end portion, and the weakened seal section is located between the second chamber and the second end portion and opposite the second chamber from the first chamber.

17. The method of claim 15, wherein the circumferential seal between the pair of film layers includes two longitudinal sections that are spaced apart from each other, at least one transversal section extending between the two longitudinal sections, and two meanders extending towards each other in a central region of the two longitudinal sections to define the narrowed passage and at least a portion of each of the first chamber and the second chamber.

18. The method of claim 15, wherein a portion of the weakened seal section includes a trapezoidal shape with a central transversal section and two lateral sections that extend to the central transversal section and towards the second chamber to converge in a direction towards the first chamber.

19. The method of claim 15, wherein at least one of the pair of film layers includes an arrow-shaped circumference that provides for a visualization of a direction of flow of the seal testing liquid from the first chamber, through the narrowed passage, into the second chamber, and out of the weakened seal section.

20. The method of claim 19, wherein the arrow-shaped circumference is provided by two longitudinal edges that are approximately parallel to each other, an arrow tail section that is located on a first end portion of the at least one of the first layer and the second layer and that is deflected towards the first chamber, and an arrow head section, which is located on a second end portion of the at least one of the first layer and the second layer and that is deflected away from the second chamber.

* * * * *

UNITED STATES PATENT AND TRADEMARK OFFICE
CERTIFICATE OF CORRECTION

PATENT NO. : 9,863,834 B2  
APPLICATION NO. : 15/034652  
DATED : January 9, 2018  
INVENTOR(S) : Peter Kozin It is certified that error appears in the above-identified patent and that said Letters Patent is hereby corrected as shown below:

In the Claims

In Column 5, Line 39: In Claim 1, please insert --connected-- after "first chamber".

Signed and Sealed this
Twenty-ninth Day of May, 2018

Andrei Iancu
*Director of the United States Patent and Trademark Office*